Figure 1:
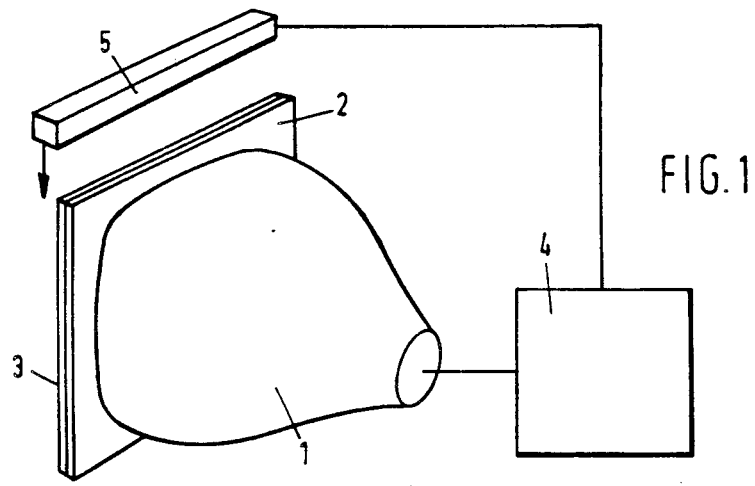

United States Patent [19]

Geluk

[11] Patent Number: 4,637,150
[45] Date of Patent: Jan. 20, 1987

[54] LIGHT BOX FOR PROVIDING A BACKGROUND ILLUMINATION HAVING BRIGHTNESS VALUES LOCALLY ADJUSTED TO THE DENSITY OF A TRANSPARENCY TO BE VIEWED BY MEANS OF THE LIGHT BOX

[75] Inventor: Ronald J. Geluk, Nootdorp, Netherlands

[73] Assignee: N.V. Optische Industrie "De Oude Delft", Netherlands

[21] Appl. No.: 735,801

[22] Filed: May 17, 1985

[30] Foreign Application Priority Data

May 18, 1984 [NL] Netherlands .................. 8401605

[51] Int. Cl.⁴ ............................................. G02B 27/02
[52] U.S. Cl. ........................................... 40/361; 40/367
[58] Field of Search ................... 40/152.2, 367, 366, 40/361

[56] References Cited

U.S. PATENT DOCUMENTS

| | | | |
|---|---|---|---|
| 1,803,631 | 5/1931 | Mabee | 40/361 |
| 2,516,270 | 7/1950 | Swain | 40/361 |
| 3,249,691 | 5/1966 | Bigelow | 40/361 |
| 3,492,486 | 1/1970 | Bischoff et al. | 40/361 |
| 4,003,151 | 1/1977 | Tolosa et al. | 40/367 |
| 4,118,654 | 10/1978 | Ohta et al. | 40/361 |
| 4,164,822 | 8/1979 | Batton | 40/361 |
| 4,267,489 | 5/1981 | Morohashi | 40/367 |
| 4,335,421 | 6/1982 | Modla et al. | 40/361 |

FOREIGN PATENT DOCUMENTS 1142655  9/1957  France .............................. 40/367

Primary Examiner—Gene Mancene
Assistant Examiner—J. Hakomaki
Attorney, Agent, or Firm—Louis E. Marn

[57] ABSTRACT

A device for directly viewing an image on a film transparency, in which the illuminating light source is controlled on the basis of discrete information elements written into and stored in a two-dimensional memory during a preliminary image brightness scanning operation. At option, the light beam produced by the light source either has its intensity or its scanning velocity controlled, in order to accordingly vary the brightness level of elementary film surface regions.

Velocity modulation is to be preferred as the beam brightness level can then be maintained at an optimally constant value, while the dynamic contrast range of the image viewed by the observer is substantially determined by the beam velocity modulation range.

6 Claims, 2 Drawing Figures

LIGHT BOX FOR PROVIDING A BACKGROUND ILLUMINATION HAVING BRIGHTNESS VALUES LOCALLY ADJUSTED TO THE DENSITY OF A TRANSPARENCY TO BE VIEWED BY MEANS OF THE LIGHT BOX

The invention relates to a light box having an illuminable screen for viewing a transparency, such as an X-ray photograph, placed in front of or on the screen.

It is common practice to view transparencies by means of such a light box. To this end, the photograph is placed on the screen, which screen provides a substantially uniform background illumination. To permit adequate viewing of normal transparencies or photographs, the luminous flux incident per unit of film area should be relatively high, for example 1000 to 10000 lux.

In general, the density range of such photographs to be viewed will be relatively wide. This entails the drawback that it is difficult to perceive detail in darker areas of such a photograph because of the high brightness level of surrounding areas.

It is an object of the invention to eliminate this drawback by providing a light box in which the contrast of the observed image can be adjusted locally in dependence upon local brightness levels.

To achieve this object, a light box according to the invention is characterized by adapting control means which so control the source that the screen is illuminated in accordance with a two-dimensional distribution with brightness values that are locally adjusted to the local density of the transparency to be viewed.

Figure 2:
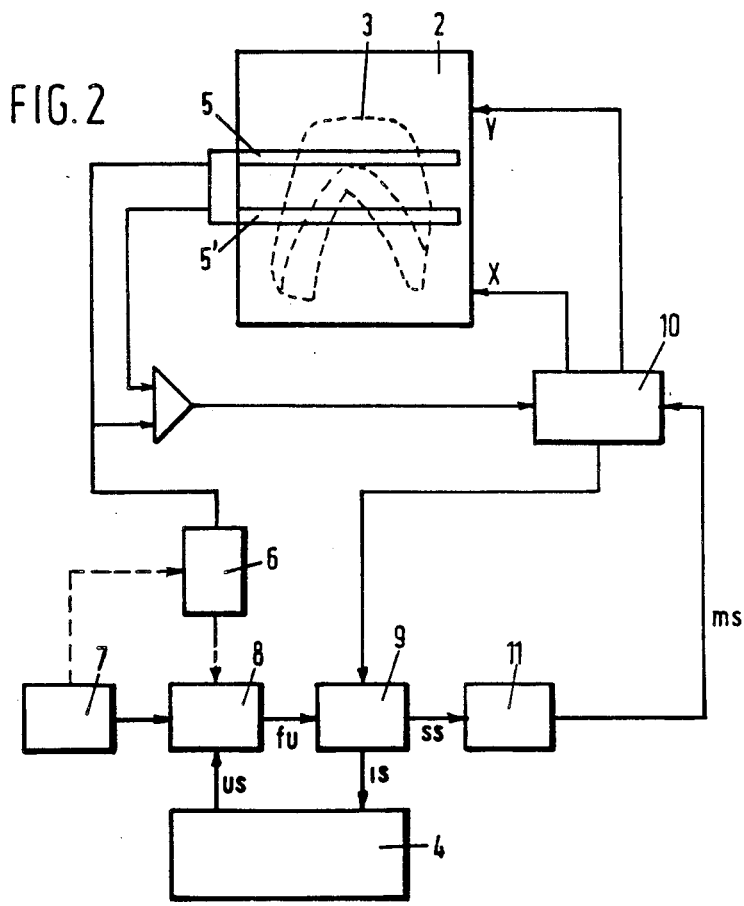

An illustrative embodiment of the invention will be described hereinafter with reference to the accompanying drawings, in which:

FIG. 1 is a general, diagrammatic representation of the principle underlying the invention; and FIG. 2 is a diagrammatic representation of an illustrative embodiment of the invention.

A light box according to the invention comprises a controllable source capable of forming a light spot of controllable location and intensity on a screen, which screen serves as the background for a transparency to be viewed, such as a transparent plate-, sheet- or film-shaped image bearing medium. For example, a 67 cm television picture tube designated by 1 in FIG. 1 may be used for this purpose.

Although not strictly necessary, a transparent screen 2 operative as a diffusor is mounted in front of the face plate of kinescope 1. A transparent film-or sheet-shaped medium 3 bearing the image to be viewed is placed on screen 2.

Provisons are made to so operate the kinescope that the electron beam scans the face plate at a rate of, for example, 50 rasters per second, resulting in a substantially uniform illumination of the face plate. In other words, initially the beam intensity is constant and has a value to illuminate the film placed on screen 2 at a normal level of illumination.

A light box according to the invention is further provided with a freely accessible image memory 4. The arrangement and the number of the locations of this image memory are decisive of a matrix division of the screen and the image to be viewed. In other words, the screen and the image are divided into a plurality of rows and columns defining a number of elementary regions (pixels) corresponding to the number of locations (addresses) of the image memory.

In accordance with the invention, initially the (average) brightness of each of these elementary regions or pixels is measured. This procedure can be qualified as the pick-up mode. To this end, a photosensitive detector 5 is placed opposite to the transparency. For the sake of simplicity, this detector is in the form of an easily manipulable rod having a photosensitive strip of a length adapted to the width of the transparency to be viewed.

By, for example manually, moving this detector one or more times past the illuminated transparency, it is possible to fill each one of the locations of the image memory with an image signal representative of the average brightness of an elementary region or pixel of the imaginary matrix overlying the transparency. The image memory has a "depth" of, for example, 5 bits, so that one of 32 different image brightness levels can be stored at each memory location. In the event of an image memory having, for example, $100 \times 100 = 10000$ locations, the matrix in question has a format of $100 \times 100$, so that an image to be viewed is divided into 10000 pixels.

Each one of the thus-stored image signals $b_i$ can be transformed by a suitable function $f(b_i)$. In accordance with the invention, the resultant control signals $f(b_i)$ are then used for modulating the electron beam of kinescope 1 during the illumination mode succeeding the pick-up mode.

As a result, the light spot formed on the face plate and the diffusor screen 2 by the scanning electron beam is modulated accordingly, so that a background illumination is achieved that is adjusted to the density range of the transparency, which results in enhanced viewability of the transparency.

In principle, either the intensity or the velocity of the electron beam and hence the light spot can be modulated in dependence upon the control signals.

Velocity modulation is preferred as it permits maintaining the intensity of the electron beam and hence the light spot at an optimally favourable, substantially constant value, with the contrast range being essentially determined by the beam velocity modulation range.

Furthermore, in principle it is possible to employ, instead of a rod-shaped photosensitive detector, a detector having a photosensitive surface area sufficient to cover the entire transparency. Such a detector need only be mounted opposite to the transparency for filling the image memory with the signals representative of the observed image.

FIG. 2 is a diagrammatic representation of an embodiment of the invention in which the above-described principle of velocity modulation is used.

The components in FIG. 2 which are equivalent to corresponding components shown in FIG. 1 are designated by the same reference numerals.

First, for the sake of simplicity it is assumed that, when the rod-shaped detector 5 is moved past the transparency 3 placed on the diffusor screen 2, for example once from top to bottom, the address location data of the pixels scanned are known. For the sake of simplicity it is further assumed that in each instantaneous position of the detector opposite to the transparency, an analog signal is obtained which is representative of the variations in brightness of the row of pixels observed by the detector. Such an analog signal is applied to an analog-to-digital converter 6. This converter is arranged for sampling the analog signals applied thereto with a sampling frequency supplied by a main clock 7, as well as for developing a digitized code signal for each pixel observed by the detector. Each such code signal is representative of the average brightness of the pixel in question. These code signals are used to control a programmable frequency divider 8, which is driven from the main clock 7. This frequency divider is so arranged that the dividing ratio, for example a power of 2, is determined by the code presented from converter 6. With a number of, for example, 32 ($2^5$) different brightness levels, each time one of the 32 different frequencies is produced at the output of divider 8. The respective one frequency $f_u$ is a measure for the average brightness of a respective pixel. Frequency signals $f_u$ produced at the output of the divider are applied to an address generator 9. This address generator 9 is arranged for allocating the locations of the image memory 4 in dependence upon the instantaneous position of the light spot formed by the electron beam on diffusor screen 2. When using a memory having a depth of, for example, 5 bits, a memory location allocated by generator 9 is then filled via the write-in path $i_s$ with a 5-bit pattern defined by the control frequency $f_u$ applied to generator 9 and hence by the average brightness of the pixel corresponding with the allocated memory address. Image memory 4 can thus be filled with a number of, for example, $33 \times 33 = 1089$ 5-bit patterns each representative of the average brightness value of one of the 1089 pixels into which the image observed by the detector is divided.

A deflection generator 10 for realizing horizontal (x-direction) and vertical (y-direction) electron beam deflection is preferably so arranged that the face plate of the kinescope is scanned in accordance with zigzag-shaped rasters, in other words without flyback blanking, preferably at a rate of more than 50 rasters per second.

This deflection generator is further fed back, in a manner not specified, to address generator 9 so that each position of the electron beam and hence that of the light spot formed thereby on diffusor screen 2 is translated by this address generator into an address of image memory 4 which corresponds with that position.

To ensure that, after a single movement of detector 5 past transparency 3, the image memory is filled with image signals which, with the configuration of addresses in which they are stored, are representative of the image, the detector may be provided with a second photosensitive strip 5' extending parallel to photosensitive strip 5. The two photosensitive detector strips 5 and 5' are combined into a structural unit. When this unit is moved past the transparency, the light spot performing the zigzag scanning movement (from left to right and vice versa in the drawing) can be caused to remain captured within the region bounded by the two photosensitive detector strips 5 and 5'. To this end, for example, the signals derived from the two detector strips 5 and 5' can (after each having been integrated in an appropriate manner) be compared to each other. In the event of unequality of the compared signals, which means that the light spot has left the region in question, deflection generator 10 is so controlled that the electron beam and hence the light spot is reset to a starting position which is preferably related to the position of the light spot at the moment it left the region.

After the pick-up mode described above has been completed and the image observed has been stored in image memory 4, the detector can be put aside and the illumination mode can be initiated. To this end, the image memory is read out via the read-out path $u_s$. In this reading procedure, the light spot positions are again translated by address generator 9 into image memory addresses (locations), and a thus-allocated memory address is read out via path $u_s$. The resultantly obtained brightness value associated with the allocated pixel is converted by a function former into a respective one of the $f(b_i)$ signals referred to above. These $f(b_i)$ signals are determinative of the instantaneous dividing ratio introduced by divider 8. In this manner, each time a subclock frequency $f_u$ is developed which is a measure for the brightness value read out at that moment. These subclock frequency signals $f_u$ are operative via address generator 9 to control a velocity modulating auxiliary generator 11.

For each of the $2^5 = 32$ different $f(b_i)$ values, the address generator produces a control signal $s_s$ characteristic of the relevant value, which control signal is associated with the memory address allocated by address generator 9. The auxiliary generator 11 is arranged for developing a modulation signal $m_s$ corresponding with the control signal $s_s$ applied thereto. Such a modulation signal causes deflection generator 10 to have the electron beam scan the face plate at a velocity corresponding with the instantaneously applying and derived $f(b_i)$ value. This means that a pixel for which a high brightness value was stored during the pick-up mode, is illuminated with a low level luminous flux during the illumination mode, and that a pixel for which a low brightness value was stored during the pick-up mode, is illuminated with a high level luminous flux during the illumination mode, in dependence upon the selected function f. In other words, during the illumination mode the electron beam is moved past the pixel in question at a relatively high and a relatively low velocity, respectively. The brightness level of the light box during the illumination mode can thus be locally adjusted to the density of the transparency.

I claim:

1. An assembly for viewing a tranparency, such as an X-ray photograph, which comprises:
   a screen for viewing said transparency, said transparency being positioned in front of said screen;
   a light source means for illuminating said screen, said light source means capable of forming a light beam on controlled location and intensity on said screen;
   means for controlling said light source means to illuminate said screen in accordance with a two-dimensional distribution of brightness level values adjusted to local density of said transparency;
   a photosensitive detection means for scanning said transparency for measuring local brightness level values representative of local light intensity levels of said transparency;
   random access memory means having memory locations corresponding to said two-dimensional distribution of brightness level values for storing in said memory location said brightness level values measured by said photosensitive detector means; and
   a control device for modulating intensity of said light beam of said light source means inversely proportional to said brightness level values read out from said random access memory.

2. An assembly for viewing a transparency, such as an X-ray photograph, which comprises:
   a screen for viewing said transparency, said transparency being positioned in front of said screen;

a light source means for illuminating said screen, said light source means capable of forming a light beam on controlled location and intensity on said screen;

means for controlling said light source means to illuminate said screen in accordance with a two-dimensional distribution of brightness level values adjusted to local density of said transparency;

a photosensitive detection means for scanning said transparency for measuring local brightness level values representative of local light intensity levels of said transparency;

random access memory means having memory locations corresponding to said two-dimensional distribution of brightness level values for storing in said memory location said brightness level values measured by said photosensitive detector means; and a control device for modulating a velocity of movement of said light beam over said screen in proportion to said brightness level values read out from said random access memory.

3. The assembly as defined in claim 1 wherein said photosensitive detector means is a rectilinear photosensitive strip.

4. The assembly as defined in claim 2 wherein said photosensitive detector means is a rectilinear photosensitive strip.

5. The assembly as defined in claim 1 wherein said photosensitive detector means includes a first and second photosensitive strip substantially parallel to each other.

6. The assembly as defined in claim 2 wherein said photosensitive detector means includes a first and second photosensitive strip substantially parallel to each other.

* * * * *